(12) United States Patent
Thorn

(10) Patent No.: US 9,958,938 B2
(45) Date of Patent: May 1, 2018

(54) GAZE TRACKING FOR A MOBILE DEVICE

(71) Applicant: Sony Mobile Communications Inc., Tokyo (JP)

(72) Inventor: Ola Thorn, Limhamn (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 711 days.

(21) Appl. No.: 14/361,127

(22) PCT Filed: Jan. 24, 2014

(86) PCT No.: PCT/IB2014/000067
§ 371 (c)(1),
(2) Date: May 28, 2014

(87) PCT Pub. No.: WO2015/110852
PCT Pub. Date: Jul. 30, 2015

(65) Prior Publication Data
US 2016/0282937 A1   Sep. 29, 2016

(51) Int. Cl.
| G06F 3/01 | (2006.01) |
| G06F 3/03 | (2006.01) |
| G06F 3/0484 | (2013.01) |
| G06T 17/00 | (2006.01) |
| G06K 9/00 | (2006.01) |
| G06T 7/73 | (2017.01) |

(52) U.S. Cl.
CPC ............. *G06F 3/013* (2013.01); *G06F 3/012* (2013.01); *G06F 3/0312* (2013.01); *G06F 3/0484* (2013.01); *G06K 9/00208* (2013.01); *G06T 7/75* (2017.01); *G06T 17/00* (2013.01); *G06T 2200/04* (2013.01); *G06T 2200/08* (2013.01); *G06T 2207/10016* (2013.01); *G06T 2207/30201* (2013.01); *G06T 2207/30244* (2013.01)

(58) Field of Classification Search
USPC ............................... 345/420, 419; 348/14.07
See application file for complete search history.

(56) References Cited

U.S. PATENT DOCUMENTS

| 2010/0156907 A1 | 6/2010 | Vanderspek et al. |
| 2011/0074822 A1 | 3/2011 | Chang |
| 2011/0128283 A1 | 6/2011 | Lee et al. |

(Continued)

FOREIGN PATENT DOCUMENTS

GB          2384959 A    8/2003

OTHER PUBLICATIONS

International Search Report issued in corresponding PCT application No. PCT/IB2014/000067, dated Apr. 24, 2014, 4 pages.

*Primary Examiner* — Kimbinh T Nguyen
(74) *Attorney, Agent, or Firm* — Tucker Ellis, LLP

(57) ABSTRACT

A method includes detecting, by a camera of a mobile device, a face of a user of the mobile device. The method includes determining a sequence of video images of the face and applying three dimensional (3D) modeling to the sequence of video images of the face to create a 3D model of the face. The method includes identifying rotational movement of the mobile device. The method includes tracking the face to identify rotational movement of the face based on the 3D model of the face, and adjusting the tracking of the face based on the 3D model of the face and rotational movement of the mobile device.

19 Claims, 8 Drawing Sheets

(56) References Cited

U.S. PATENT DOCUMENTS

| | | | |
|---|---|---|---|
| 2011/0273466 A1 | 11/2011 | Imai et al. | |
| 2013/0127827 A1* | 5/2013 | Shiell | G06T 17/00 345/419 |
| 2013/0235347 A1* | 9/2013 | Hennessey | G06F 3/013 351/210 |
| 2013/0304479 A1* | 11/2013 | Teller | G06F 3/013 704/275 |
| 2014/0300538 A1* | 10/2014 | Rijnders | G06F 3/013 345/156 |
| 2015/0009277 A1* | 1/2015 | Kuster | G06T 15/205 348/14.07 |
| 2015/0128075 A1* | 5/2015 | Kempinski | G06F 3/012 715/765 |
| 2015/0145777 A1* | 5/2015 | He | G06K 9/0061 345/158 |

* cited by examiner

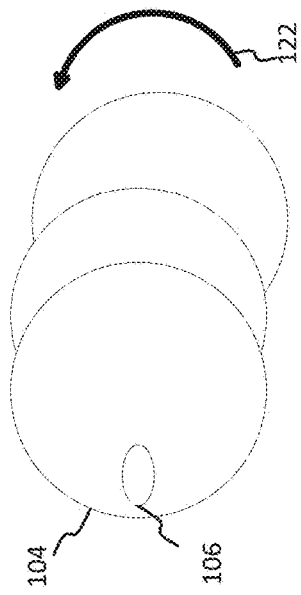
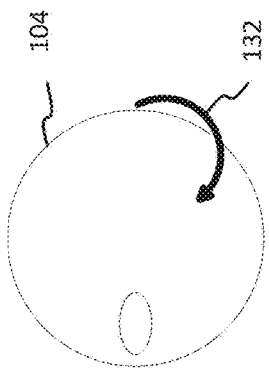
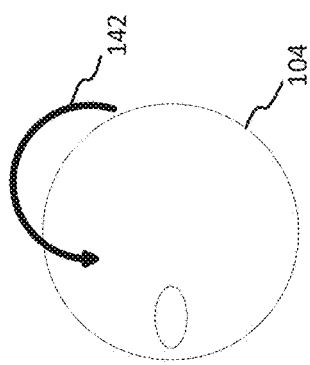
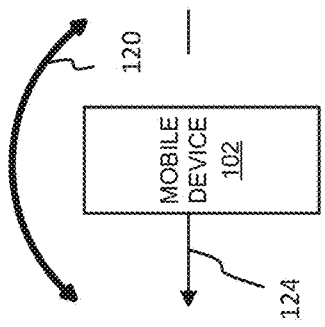
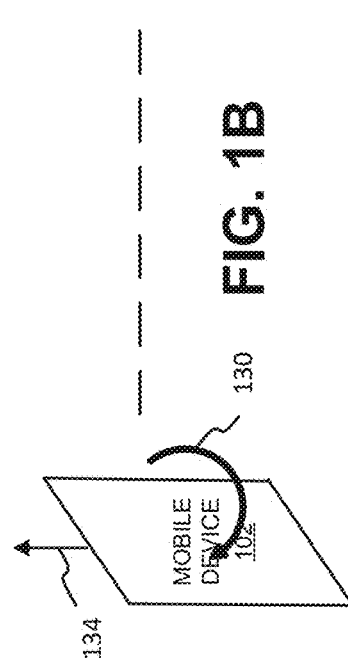
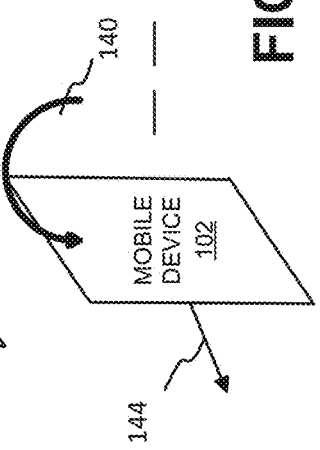

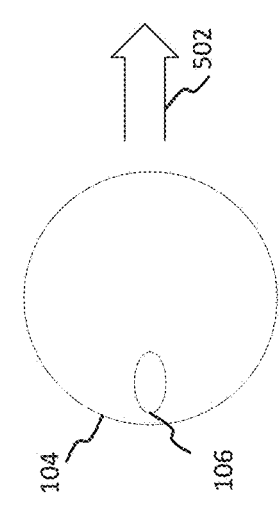
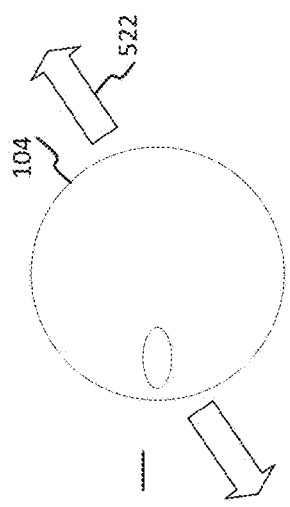
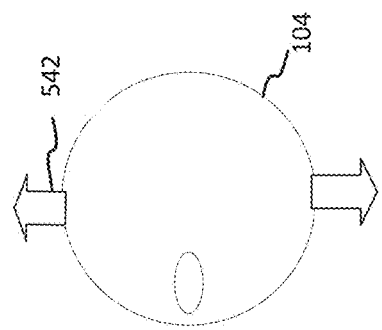
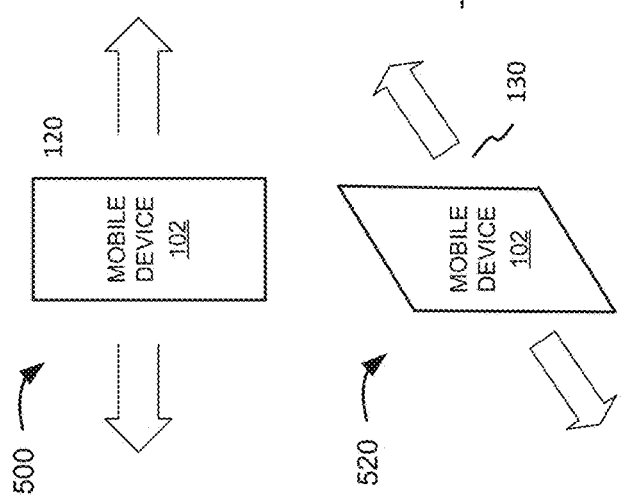
FIG. 5A
FIG. 5B
FIG. 5C

GAZE TRACKING FOR A MOBILE DEVICE

BACKGROUND ART

Eye tracking for mobile devices is the process of measuring the point of gaze (i.e., a point at which a user is focused/looking at) or the motion of the eye relative to the mobile device. In some instances of eye tracking, the mobile device tracks the movements of the pupils. Mobile devices are known to determine an input based on the tracked gaze of the user. For example, some mobile devices include a feature that automatically scrolls text based on the position of the eyes.

SUMMARY

In one implementation, a computer-implemented method includes detecting, by a camera of a mobile device, a face of a user of the mobile device. The method includes determining a sequence of video images of the face and generating a three dimensional (3D) model of a head of the user based on the sequence of video images of the face. The method includes identifying rotational movement of the mobile device. The method includes tracking the face to identify rotational movement of the face based on the 3D model of the head, and adjusting the tracking of the face based on the 3D model of the head and rotational movement of the mobile device.

In addition, the method may further include detecting particular rotational movement of the face, and generating commands by the mobile device based on the detected particular rotational movement.

In addition, the detected particular rotational movement may include rotational movement around a yaw axis of the head.

In addition, implementing the command may further include activating an audio output of the mobile device based on the detected particular rotational movement.

In addition, generating the command may further include terminating the audio output based on an additional detected particular rotational movement.

In addition, the method may further include detecting at least one of a particular rotational speed and a particular rotational direction with respect to movement of the face, and generating commands by the mobile device based on the at least one of the detected particular rotational speed and the detected particular rotational direction.

In addition, when applying 3D modeling to the sequence of video images of the face to create a 3D model of the head, the method may further include generating a point cloud representation of the head based on the sequence of video images of the face.

In addition, when tracking the face, the method may further include tracking the face to a position at which only one eye is visible.

In addition, the method may include tracking the face based on selected facial feature points including one or more of the eyes, nose, eyebrows and mouth.

In addition, when adjusting the tracking of the face based on the 3D model of the head, the method may include filtering out accidental or incidental movement to stabilize tracking per axis based on tracking of the mobile device and tracking of the face.

In addition, the method may further include combining the sequence of video images of the face with a predetermined model of a head to determine the 3D model of the head.

In another implementation, a mobile device may include a video camera to receive video images of a user, a memory to store a plurality of instructions, and a processor configured to execute instructions in the memory to detect, by the video camera, a face of the user, determine a sequence of video images of the face, apply 3D modeling to the sequence of video images of the face to create a 3D model of the face, identify rotational movement of the mobile device, track the face to identify rotational movement of the face based on the 3D model of the face, and adjust the tracking of the face based on the 3D model of the face and rotational movement of the mobile device.

In addition, the processor is further to detect particular rotational movement of the face and generate commands by the mobile device based on the detected particular rotational movement.

In addition, the detected particular rotational movement includes rotational movement around a yaw axis of the face.

In addition, the mobile device may further include an infrared (IR) camera to receive IR images of the user.

In addition, the processor is further to detect at least one of a particular rotational speed and a particular rotational direction with respect to movement of the face, and generate commands by the mobile device based on the at least one of the detected particular rotational speed and the detected particular rotational direction.

In addition, when applying 3D modeling to the sequence of video images of the face to create a 3D model of the face, the processor is further to generate a point cloud representation of the face based on the sequence of video images.

In addition, when tracking the face, the processor is further configured to track the face to a position at which no eyes are visible.

In yet another implementation, a non-transitory computer-readable medium includes instructions to be executed by a processor in an audio device, for causing the processor to detect, by a video camera, a face of the user of a mobile device, determine a sequence of video images of the face, apply three dimensional (3D) modeling to the sequence of video images of the face to create a 3D model of the face, identify rotational movement of the mobile device, track the face to identify rotational movement of the face based on the 3D model of the face, and adjust the tracking of the face based on the 3D model of the face and rotational movement of the mobile device.

In addition, when tracking the face, the instructions further include instructions for the processor to filter out accidental or incidental movement to stabilize tracking per axis based on tracking of the mobile device and tracking of the face.

BRIEF DESCRIPTION OF DRAWINGS

The accompanying drawings, which are incorporated in and constitute part of this specification, illustrate one or more embodiments described herein and, together with the description, explain the embodiments. In the drawings:

FIG. 1A illustrates concepts of tracking rotational movement of a gaze tracking mobile device and a head of a user around their respective axes consistent with embodiments described herein;

FIG. 1B illustrates concepts of tracking rotational movement of a gaze tracking mobile device and a head of a user around their respective axes consistent with embodiments described herein;

FIG. 1C illustrates concepts of tracking rotational movement of a gaze tracking mobile device and a head of a user around their respective axes consistent with embodiments described herein;

FIG. 5A is block diagrams illustrating concepts described herein for detecting planar movement of a face relative to the gaze tracking mobile device of FIGS. 1A-1C;

FIG. 5B is block diagrams illustrating concepts described herein for detecting planar movement of a face relative to the gaze tracking mobile device of FIGS. 1A-1C;

FIG. 5C is block diagrams illustrating concepts described herein for detecting planar movement of a face relative to the gaze tracking mobile device of FIGS. 1A-1C;

DESCRIPTION OF EMBODIMENTS

Figure 2:
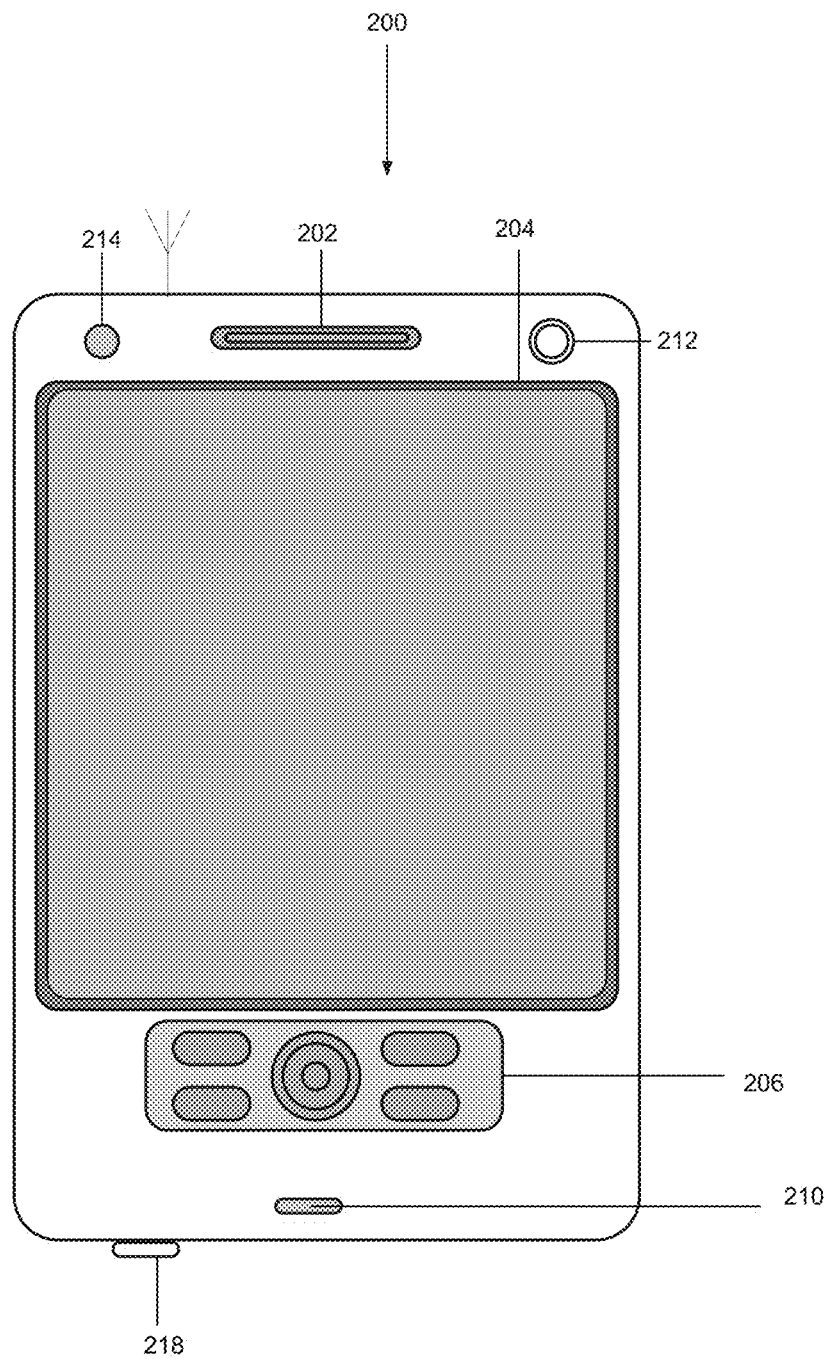
FIG. 2 illustrates an exemplary device consistent with embodiments described herein.

The following detailed description refers to the accompanying drawings. The same reference numbers in different drawings may identify the same or similar elements. It should be noted that the drawings have not been drawn to scale and that the dimensions of certain features have been exaggerated for the sake of clarity. Also, the following detailed description is exemplary and explanatory only and is not restrictive of the invention, as claimed.

Embodiments described herein relate to devices, methods, and systems for detecting rotational movement of a face relative to a mobile device based on a three dimensional (3D) model of the face. In implementations described herein, the systems and methods may determine a 3D model or representation of a face based on two dimensional (2D) imaging of the face received from a camera input of the mobile device. The systems may determine rotational movements of the face based on the 3D model and the current camera input. The systems may determine rotational movements of the mobile device based, for example, on measurements detected by a gyroscope component of the mobile device. The systems may dynamically isolate rotations per device/face to enable 3D tracking of the face to stabilize gaze tracking.

Consistent with embodiments described herein, the stabilized gaze tracking using 2D-3D face detection may be applied to reduce errors in unpredictable light conditions that may affect other gaze tracking systems, (e.g., 3D gaze tracking may be used to supplement or replace infrared (IR) based trackers). Additionally, the methods and systems may implement stabilized gaze tracking to compensate for vibrations and rotations of the device. The methods and systems may stabilize gaze tracking to allow constant tracking of the eyes.

FIGS. 1A, 1B and 1C illustrate concepts described herein. More specifically, FIGS. 1A-1C illustrate concepts of tracking rotational movement of a gaze tracking mobile device 102 (also referred to herein as mobile device 102, device 102 or 3D gaze tracking mobile device 102) and a head/face 104 of a user around their respective axes (by the gaze tracking mobile device 102). Although particular combinations of motion of gaze tracking mobile device 102 and face 104 have been shown for clarity, it should be understood that different combinations of movement may be detected by gaze tracking mobile device 102 (e.g., gaze tracking mobile device 102 may detect rotational movement and linear movement of either or both face 104 and gaze tracking mobile device 102 or simultaneous components of movement in the multiple planes of movement by either or both face 104 and gaze tracking mobile device 102).

Gaze tracking mobile device 102 may be a handheld device that includes a video camera and capability to detect rotational movement based on a 3D model of a face. In some implementations, gaze tracking mobile device 102 may include an IR camera that may capture images of the face in addition to or in place of images captured by the video camera. Gaze tracking mobile device 102 may include, for example, a gaming console, a smartphone that may combine a cellular radiotelephone with data processing and data communications capabilities, a tablet computer, a laptop computer, a personal computer, a music playing device, or other types of computation or communication devices.

A user may interact with gaze tracking mobile device 102 by placing his/her face/head 104 in a line of sight mobile device 102. Gaze tracking mobile device 102 may identify a particular area 106 of the face 104 of the user that corresponds to the eyes of the user and track the particular area 106. In some implementations, gaze tracking mobile device 102 may track other facial feature points of the face 104 of the user, such as the nose, eyebrows, mouth, etc. Gaze tracking mobile device 102 may include machine readable instructions and/or hardware components that enable gaze tracking (e.g., a video camera, an IR camera, accelerometers and a gyroscope (not shown in FIG. 1A-1C)). Gaze tracking mobile device 102 may track the linear motion of the mobile device 102 and/or the face 104, such as described with respect to FIGS. 5A-5C herein below. The linear motion may be detected along axes directly (or, in some instances, approximately) perpendicular, vertical or parallel to the front of gaze tracking mobile device 102.

Gaze tracking mobile device 102 may track the rotational movements of gaze tracking mobile device 102 around the internal axes of motion of gaze tracking mobile device 102, as shown in FIGS. 1A to 1C, based on measurements from a gyroscope associated with gaze tracking mobile device 102. Gaze tracking mobile device 102 may also track the rotational movements of the face 104 around the internal axes of the face 104 (which may be analyzed in a similar manner as the yaw, pitch and roll of an aircraft in aeronautics), as shown in FIGS. 1A to 1C, based on feedback from an internal camera, and, in some instances, 3D modeling of the face 104, as described with respect to FIG. 6.

With reference now to FIG. 1A, FIG. 1A shows pitch 120 of gaze tracking mobile device 102, which is rotational movement in which the angles of rotation of gaze tracking mobile device 102 are around the lateral (or transverse, or pitch) axis 124 of gaze tracking mobile device 102. The pitch 120 of gaze tracking mobile device 102 may be detected by a gyroscope. FIG. 1A also shows pitch 122 of the head 104 of the user around the lateral axis of the head 104. Gaze tracking mobile device 102 may detect rotational movement around the lateral axis 124 of face/head 104 (pitch 122) via a video camera included in mobile device 102. Alternatively, or additionally, gaze tracking mobile device 102 may detect rotational movement of the face/head 104 via an infrared camera. In some implementations, gaze tracking mobile device 102 may incorporate 3D modeling (e.g., a Euclidean model or Cartesian model) of the head/face 104 to increase the accuracy of the detection of the pitch 122 of the head/face 104 of the user.

FIG. 1B shows yaw 130 of gaze tracking mobile device 102, which is rotational movement in which the angles of rotation of mobile device 102 are around the normal (or perpendicular or yaw) axis 134 of gaze tracking mobile device 102. The yaw 140 of mobile device 102 may be detected by a gyroscope. Gaze tracking mobile device 102 may detect rotational movement around the normal axis 134 of gaze tracking mobile device 102 by a gyroscope. FIG. 1B also shows yaw 132 of the face/head 104 of the user around the normal axis of the face/head 104. Gaze tracking mobile device 102 may detect movement around the normal axis of face/head 104 (yaw 132) via application of 3D modeling to 2D video image input of the face 104 of the user as described below with respect to FIG. 6.

FIG. 1C shows roll 140 of gaze tracking mobile device 102, which is rotational movement in which the angles of rotation of gaze tracking mobile device 102 are around the longitudinal (or roll) axis 144 of gaze tracking mobile device 102. Gaze tracking mobile device 102 may detect roll 140 based on gyroscope measurements. FIG. 1C also shows roll 142 of the head 104 of the user around the longitudinal axis 144 of the head 104. Gaze tracking mobile device 102 may detect rotational movement around the lateral axis of face/head 104 (roll 142) via a camera. In some implementations, gaze tracking mobile device 102 may incorporate 3D modeling of the head/face 104 to increase the accuracy of the detection of the roll 142 of the head/face 104 of the user.

In implementations described herein, systems and methods may determine a 3D representation of the face of a user based on 2D video imaging received at a device (i.e., camera input) and dynamically isolate rotations per device/face to enable 3D tracking of the face by the device. The systems and methods may stabilize and optimize gaze tracking. The systems and methods may enable efficient tracking in unpredictable light conditions and in conditions in which vibrations and rotations of the device may lead to a lost tracking of the eyes (e.g., one or both of the eyes may be out of the line of sight of the mobile device). The systems and methods may reduce sensitivity of the gaze tracking to vibrations to increase ease and accuracy of use of functions based on the gaze tracking in a mobile context.

FIG. 2 is a diagram of an exemplary device 200 in which the concepts described herein may be implemented. Device 200 may include any of the following devices: a music player device (e.g., a Moving Picture Experts Group (MPEG) MPEG-1 or MPEG-2 audio layer III (mp3) player, compact disc (CD) player, etc.), a mobile telephone; a cellular phone; a smart phone; an electronic notepad and/or a tablet computer; a laptop or personal computer; a personal digital assistant (PDA) that can include a telephone; a gaming device or console; or another type of device that may track the position of either or both of the device 200 and a user during operation.

In this implementation, device 200 may take the form of a mobile phone (e.g., a cell phone). As shown in FIG. 2, device 200 may include a speaker 202, a touchscreen display 204, control buttons 206, a microphone 210, sensors 212, a front camera 214, a housing 216, and a headphone jack socket 218.

Speaker 202 may provide audible information to a user of device 200.

Display 204 may provide visual information to the user, such as an image of a caller, video images, or pictures. In addition, display 204 may include a touchscreen for providing input to device 200. Display 204 may provide hardware/software to detect the coordinates of an area that is touched by user 104. For example, display 204 may include a display panel, such as a liquid crystal display (LCD), organic light-emitting diode (OLED) display, and/or another type of display that is capable of providing images to a viewer. Display 204 may include a transparent panel/surface for locating the position of a finger or an object (e.g., stylus) when the finger/object is touching or is close to display 204.

Control buttons 206 may permit the user to interact with device 200 to cause device 200 to perform one or more operations, such as place or receive a telephone call. In some implementations, control buttons 206 may include a telephone keypad (not shown) that may be complementary to graphical user interface (GUI) objects generated on touchscreen display 204. Microphone 210 may receive audible information from the user. Sensors 212 may include components that collect and provide information that is used to determine a motion and orientation of device 200 (e.g., accelerometers, gyroscopes, magnetometer, inertia-switch sensor, etc.). Sensors 212 may also collect and provide, to device 200, information (e.g., acoustic, infrared, etc.) that is used to aid the user in capturing images or in providing other types of information (e.g., a distance between a user and device 200). Front camera 214 may enable a user to view, capture and store images (e.g., pictures, video clips) of a subject in front of device 200. Housing 216 may provide a casing for components of device 200 and may protect the components from outside elements.

Headphone jack socket 218 may receive an input/output jack of a headset. Device 200 may output an audio signal to a headset connected via headphone jack socket 218.

Figure 3:
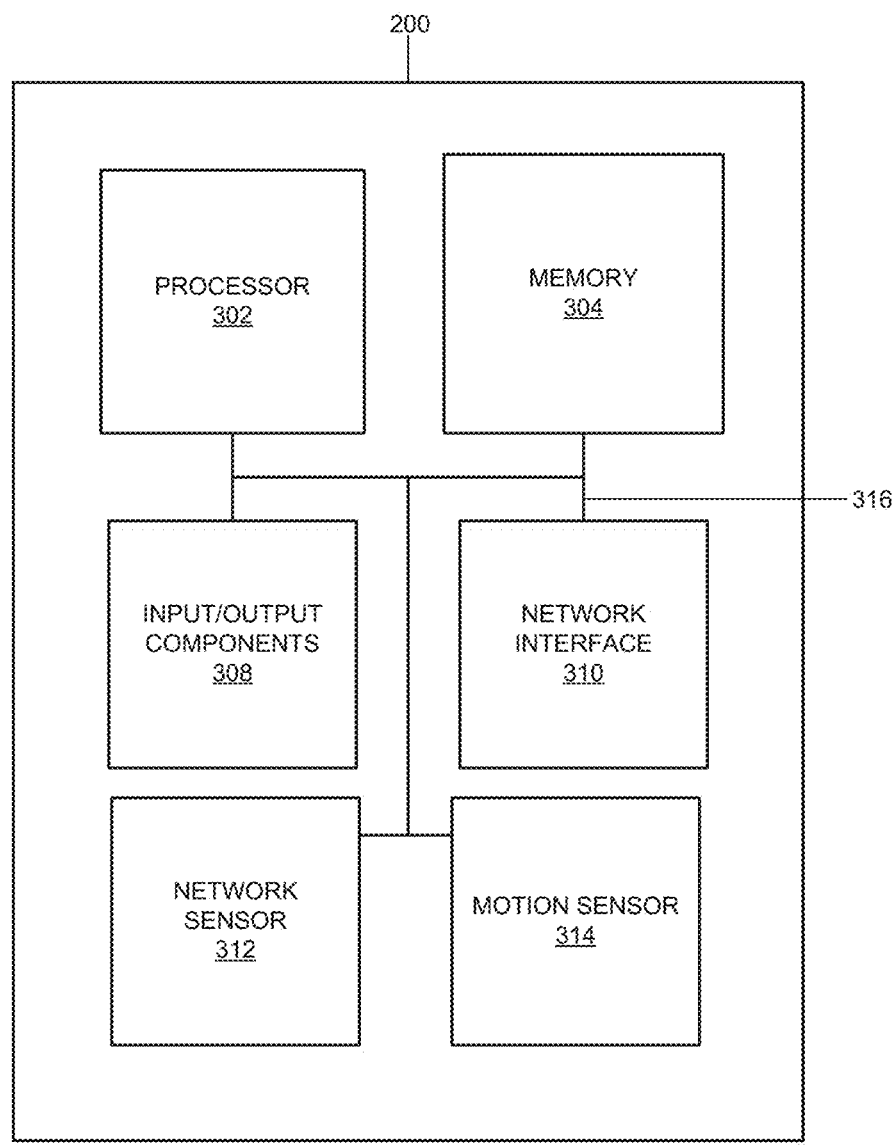
FIG. 3 is a block diagram of exemplary components of the device of FIG. 2.

FIG. 3 is a block diagram of the device of FIG. 2. As shown in FIG. 3, device 200 may include a processor 302, a memory 304, input/output components 308, a network interface 310, a network sensor 312, a motion sensor 314 and a communication path 316. In different implementations, device 200 may include additional, fewer, or different components than the ones illustrated in FIG. 3. For example, device 200 may include additional network interfaces, such as interfaces for receiving and sending data packets.

Processor 302 may include a processor, a microprocessor, an Application Specific Integrated Circuit (ASIC), a Field Programmable Gate Array (FPGA), and/or other processing logic (e.g., audio/video processor) capable of processing information and/or controlling device 200.

Memory 304 may include static memory, such as read only memory (ROM), and/or dynamic memory, such as random access memory (RAM), or onboard cache, for storing data and machine-readable instructions. Memory 304 may also include storage devices, such as a floppy disk, CD ROM, CD read/write (R/W) disc, and/or flash memory, as well as other types of storage devices.

Input/output components 308 may include a display screen (e.g., touchscreen display 204, etc.), a keyboard, a mouse, a speaker, a microphone, a Digital Video Disk (DVD) writer, a DVD reader, Universal Serial Bus (USB) lines, and/or other types of components for converting physical events or phenomena to and/or from digital signals that pertain to device 200. Input/output components 308 may also include a motion detecting camera that may detect a position of a user of device 200.

Network interface 310 may include a transceiver that enables device 200 to communicate with other devices and/or systems. For example, network interface 310 may include mechanisms for communicating via a network, such as the Internet, a terrestrial wireless network (e.g., a wireless local area network (WLAN)), a cellular network, a satellite-based network, a wireless personal area network (WPAN), etc. Additionally or alternatively, network interface 310 may include a modem, an Ethernet interface to a LAN, and/or an interface/connection for connecting device 200 to other devices (e.g., a Bluetooth interface).

Network sensor 312 may provide information regarding contact received from user 104 at a particular portion of a touchscreen display of device 200.

Motion sensor 314 may include an accelerometer, gyroscope, etc., that provides information regarding motion of device 200. Motion sensor 314 may periodically determine motion of device 200. Additionally, motion sensor 314 may detect a position and/or motion of external objects, including the user, with regard to device 200.

Communication path 316 may provide an interface (e.g., a bus) through which components of device 200 may communicate with one another.

Figure 4:
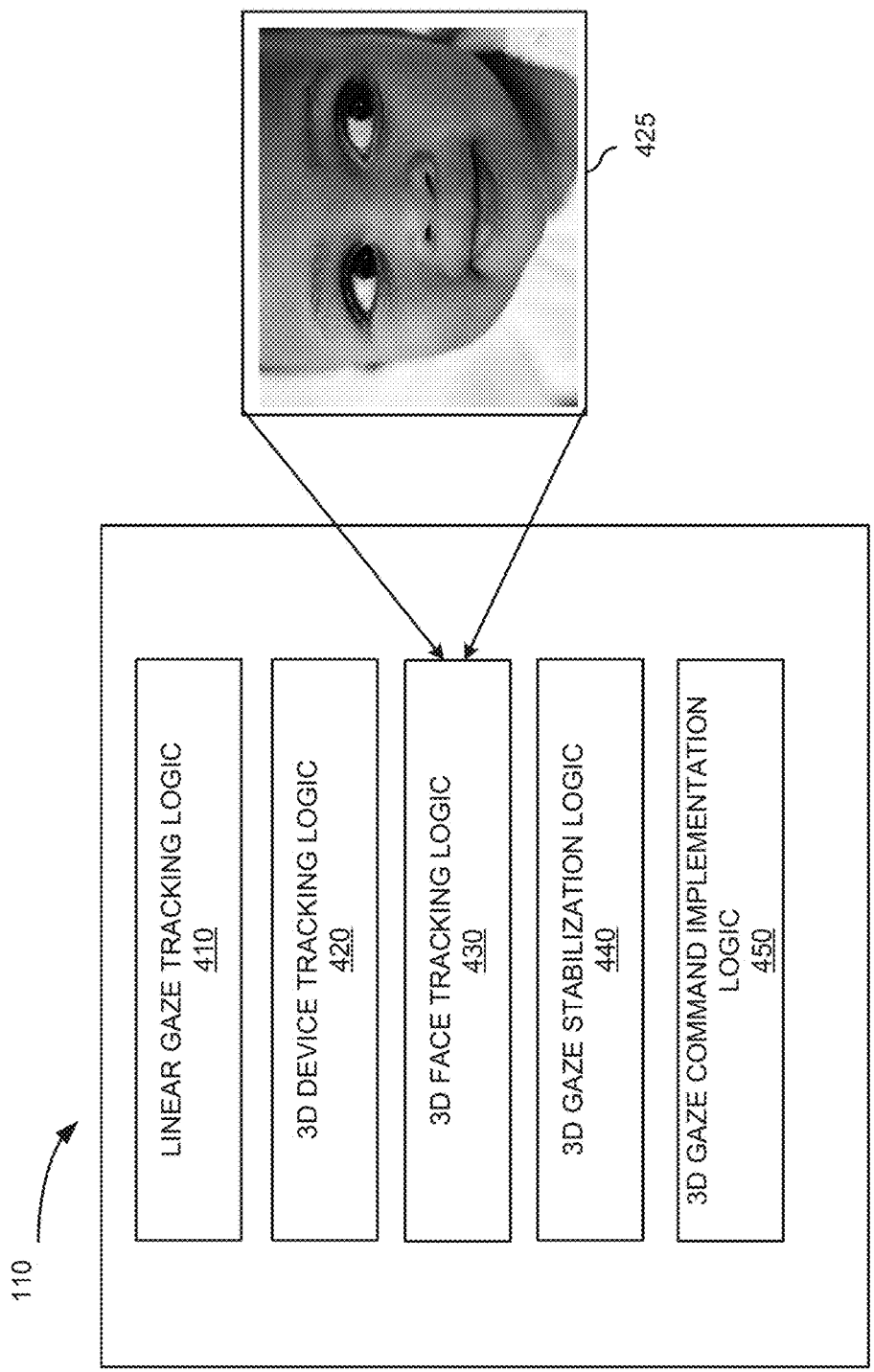
FIG. 4 is an exemplary functional block diagram of components implemented in the gaze tracking mobile device of FIGS. 1A-1C.

FIG. 4 is an exemplary functional block diagram of components implemented in gaze tracking mobile device 102. In an exemplary implementation, all or some of the components illustrated in FIG. 4 may be stored in memory 304. For example, referring to FIG. 4, memory 304 may include linear gaze tracking logic 410, 3D device tracking logic 420, 3D face tracking logic 430, 3D gaze stabilization logic 440, and 3D gaze command implementation logic 450. In addition, various logic components illustrated in FIG. 4 may be implemented by processor 302 executing one or more programs stored in memory 304. Other configurations may be implemented. Therefore, gaze tracking mobile device 102 may include additional, fewer and/or different components than those depicted in FIG. 4.

Linear gaze tracking logic 410 may determine linear movements of the mobile device 102 and the head 104 of the user, such as described below with respect to FIGS. 5A-5C. Linear gaze tracking logic 410 may implement gaze tracking and stabilization of gaze tracking based on the linear movements. For example, linear gaze tracking logic 410 may compensate for the tracked gaze based on detected movement in the lateral plane of the head 104 by adjusting the position of the gaze (i.e., the gaze input to gaze tracking mobile device 102, identified by analysis of camera images) and the corresponding motion attributed to either the mobile device 102 or the head 104 based on the detected movement.

Linear gaze tracking logic 410 may determine a difference between motion of device 102 and face/head 104 in lateral planes via accelerometer measurements and the camera information of the position of the head/face along the lateral planes.

Linear gaze tracking logic 410 may detect planar movement towards or away 502 from the device/face (detected via accelerometer (for gaze tracking mobile device 102) and the relative size of the face 104 (for the user/face 104) (see, e.g., planar movement towards or away from the mobile device/face 500, or both mobile device 102 and face 104, FIG. 5A). In this instance, linear gaze tracking logic 410 may determine the intended command from the user based on the adjusted camera input relative to the motion, position and size of the face 104 and motion of gaze tracking mobile device 102.

Linear gaze tracking logic 410 may detect planar movement sideways direction 522 relative to phone/face (detected via accelerometer/position of face in the horizontal plane) (see, e.g., planar movement sideways relative to mobile device/face 520 for both mobile device 102 and face 104, FIG. 5B). In this instance, linear gaze tracking logic 410 may determine the intended command from the user based on the adjusted camera input relative to the motion and position of the face 104 in the horizontal plane.

Linear gaze tracking logic 410 may detect planar movement vertical direction 542 relative to phone/face (detected via accelerometer/position of face in the vertical plane) (see, e.g., planar movement that is vertical relative to both mobile device 102 and face 104 (540), FIG. 5C). In this instance, linear gaze tracking logic 410 may determine the intended command from the user based on the adjusted camera input relative to the motion and position of the face 104 in the vertical plane.

3D device tracking logic 420 may track rotation of gaze tracking mobile device 102 about its own axes (pitch, yaw and roll axes of gaze tracking mobile device 102) via one or more gyroscopes. For example, with reference to FIG. 1A, 3D device tracking logic 420 may track pitch 120 of gaze tracking mobile device 102 via a gyroscope. 3D device tracking logic 420 may incorporate gyroscope measurements to stabilize gaze tracking based on rotational movements on the axes of either or both of the gaze tracking mobile device 102 or the face/head 104 of the user. For example, 3D device tracking logic 420 may adjust the video camera input (and computations of the rotational movement of the face 104 based on the video camera input) based on the gyroscope detected rotational movements of gaze tracking mobile device 102.

3D face tracking logic 430 may detect rotational movement (yaw 132) of the face 104 by using 3D face analysis based on 2D input. 3D face tracking logic 430 may determine a 3D model or representation of face 104 based on 2D imaging of the face 104 received from a video camera input of mobile device 102. For example, 3D face tracking logic 430 may receive a series of video images 425 of the user (shown in FIG. 4 as a single image or picture of a user). 3D face tracking logic 430 may determine a 3D representation of the face 104 as described with respect to FIG. 6. 3D face tracking logic 430 may determine rotational movements of the face based on the 3D model and the current camera input. 3D face tracking logic 430 may determine the motion of the 3D representation of face from 2D video camera input to dynamically isolate rotations per device/face enabling 3D tracking of face (i.e., to stabilize gaze tracking).

3D gaze stabilization logic 440 may stabilize gaze tracking based on the 3D tracking of face 104. For example, 3D gaze stabilization logic 440 may track the gaze of the user based on multiple points (in a point cloud) associated with the 3D representation of the face 104. The point cloud is a collection of points in a 3D space that represent a body (or in this instance, a head 104). 3D gaze stabilization logic 430 may track the approximate position of the eyes based on the identified position of other points of the head in the point cloud. This may allow 3D gaze stabilization logic 440 to maintain the gaze tracking in unpredictable light conditions (that may affect alternative gaze tracking devices/components, e.g. IR based trackers). 3D gaze stabilization logic 440 may also allow the mobile device 102 to maintain gaze tracking in an environment in which there are significant vibrations and rotations of gaze tracking mobile device 102 and/or face/head 104. 3D gaze stabilization logic 440 may significantly reduce or eliminate lost tracking with the eyes that would otherwise make gaze tracking difficult in a mobile context (e.g., when the user of the gaze tracking mobile device 102 is commuting, walking, etc.). 3D gaze stabilization logic 440 may detect the difference between tilt of the device and movement of the face 104 (and, in some instances, the eyes in particular).

3D gaze command implementation logic 440 may implement commands based on 3D gaze analysis. 3D gaze command implementation logic 440 may use detected rotational movements, such as pitch 122, yaw 132 or roll 142 of face/head 104 for additional inputs, e.g., confirm or reject an action. For example, the user may turn his/her head 104 sideways (thereby generating yaw 132) to provide a specific command. This may allow the user to input a greater range of commands via rotational movement of the head 104 than in conventional systems, which may be limited by requirements for lateral movement. Commands may include, for example, magnification or highlighting text on mobile device 102, switching to audio output as opposed to text output (when the user turns his/her face away from mobile device 102), etc. The audio may stop when the user turns his/her face 104 back to a sufficiently frontal position or angle.

If the movement of either face 104 or gaze tracking mobile device 102 is accidental, mobile device 102 may ignore (or compensate for) the movement for purposes of gaze/face tracking. For example, if gaze tracking mobile device 102 detects rotations of a very short duration rotations and/or of a small angular rotation, gaze tracking mobile device 102 may determine that these rotations are unintentional or incidental and no adjustments or new commands may be provided by 3D gaze command implementation logic 440 in response to such unintentional or incidental movements.

Figure 6:
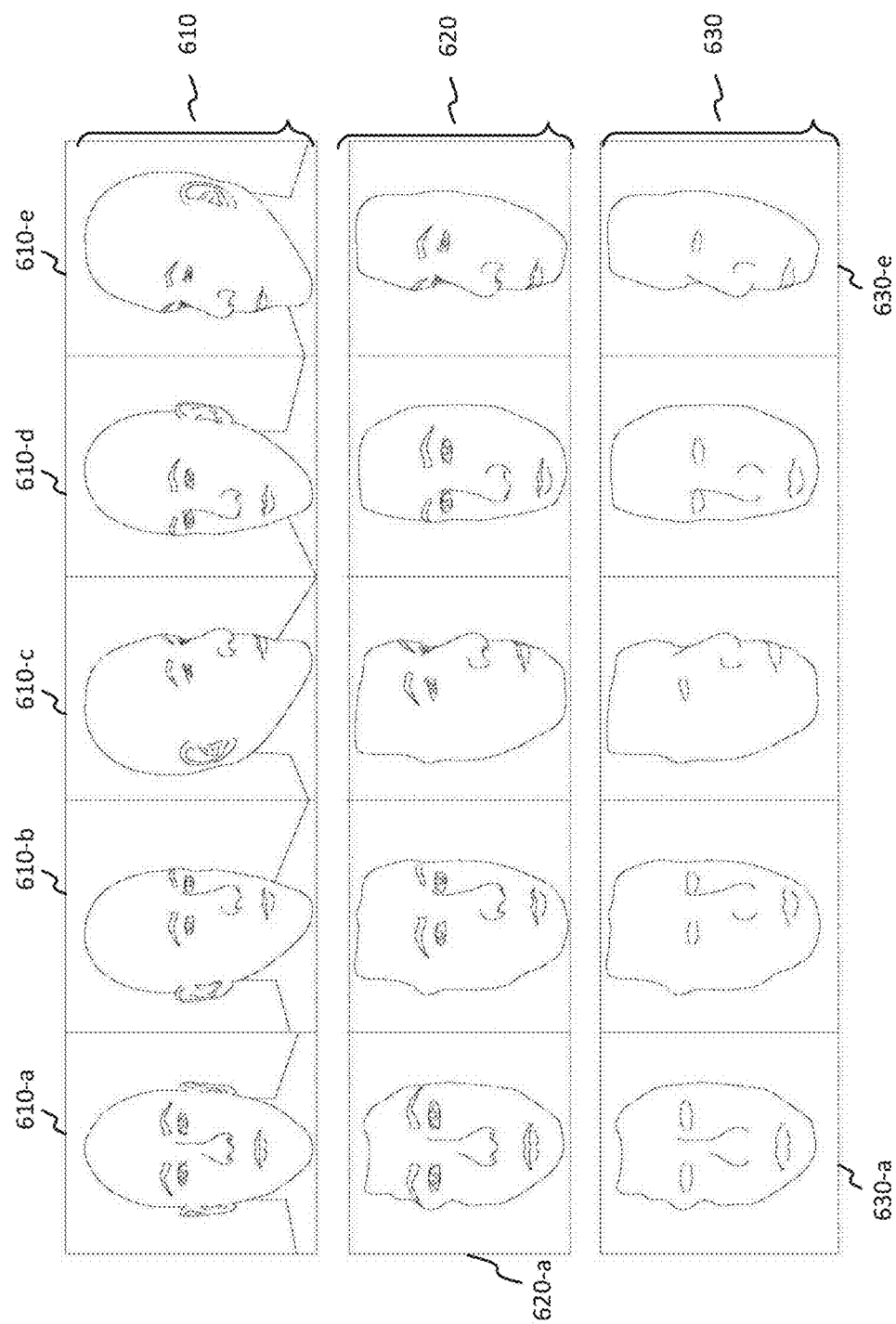
FIG. 6 illustrates concepts described herein for determining a three dimensional (3D) model of a face based on two dimensional (2D) input (video images of a user) from a camera.

FIG. 6 illustrates stages of image processing to determine a 3D representation of the face 104 based on 2D imaging of face 104 received from a camera input (e.g., camera 214) of gaze tracking mobile device 102.

3D face tracking logic 430 may receive the camera input and detect a face 104 of the user. In some implementations the camera (e.g., camera 214) may be an ultra-high resolution camera. 3D face tracking logic 430 may determine a 3D representation of face 104 based on the 2D input. For example, 3D face tracking logic 430 may detect a sequence of face images. 3D face tracking logic 430 may apply appropriate calculations to determine the 3D representation of the face 104 (e.g., 3D face tracking logic 430 may apply face recognition and 3D modeling machine-readable instructions).

According to one example, the top row 610 of FIG. 6 represents still video images of different poses of a face 104 (610-a to 610-e) that a user may take in relation to camera 214 of mobile device 102. Video image 610-a represents a frontal view of the face 104 (i.e., the user is face forward (and looking directly at the camera)). 3D face tracking logic 430 may capture video images that provide poses at key intervals of the range of motion throughout a rotational movement of the face 104. For example, video image 610-b may represent (be a camera image of) the user turning his/her face to the left and video image 610-c may represent the user turning further to the left.

3D face tracking logic 430 may isolate a particular area of the face that includes feature points such as eyebrows, eyes, nose and mouth, such as shown in middle row 620. 3D face tracking logic 430 may crop the region of interest for each still video image (i.e., for each video camera picture of the user shown in top row 610). Each of the images in row 620 (video image 620-a, 620-b, etc.) represents the cropped area of video images captured in each corresponding column of row 610.

3D face tracking logic 430 may determine a 3D representation of face/head 104 for each pose (630a-630-e) based on the cropped video images (620-a-620-e) corresponding to row 620 (i.e., the cropped region of interest of face 104). 3D face tracking logic 430 may build a 3D model of the head using this sequence. The 3D model may be a textured representation of the face/head 104 that includes calculated plot points along a three dimensional Cartesian coordinate system (i.e., the x, y, and z axes). 3D face tracking logic 430 may determine stereo motion (i.e., vectors in a plurality of planes of motion) based on the 3D model of the face 104. 3D face tracking logic 430 may also perform texture mapping to increase the definition of the 3D representation of face/head 104. In some implementations, 3D face tracking logic 430 may combine the video images with a predetermined model of a face (or head) to determine the 3D model of the face (or head) (e.g., when areas of the face 104 are obscured) and corresponding motion in 3D.

3D face tracking logic 430 may implement the 3D representation of face 104 to track the position of the face 104 (and regions of the face 104, such as the eyes) in three dimensions. 3D face tracking logic 430 may monitor the variation of poses from image to image to determine yaw 132 of face 104 (or the 3D model of face 104). 3D face tracking logic 430 may determine that changes in the position of face 104 in particular directions over predefined maximum time intervals (i.e., a minimum velocity to the left or right) correspond to particular commands.

Although the 3D modeling of face 104 is described with respect to yaw of face 104 (and corresponding motion and poses along the normal axis (FIG. 6 and corresponding poses of head/face 104 in rows 610, 620 and 630), similar principles may be applied to model rotational movement of the face 104 along the perpendicular and longitudinal axes to enhance accuracy of determination of the rotational movement and provide a more complete overall model of the motion of face 104 in all planes (lateral and rotational) with respect to gaze tracking mobile device 102.

Figure 7:
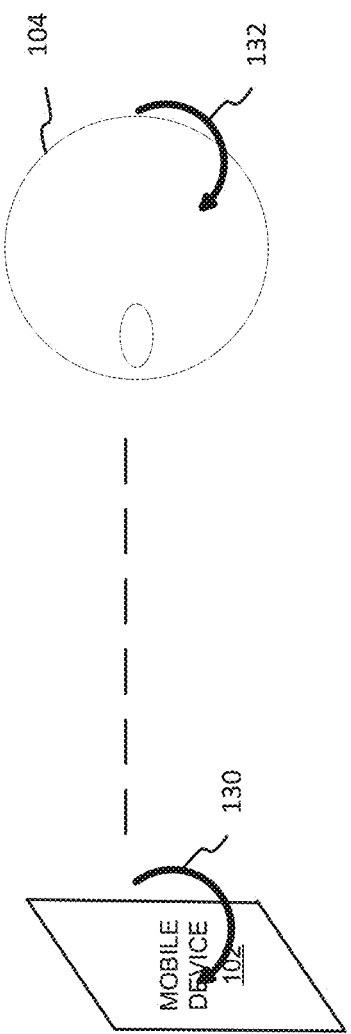
FIG. 7 is a diagram illustrating detection of rotational movement based on a 3D model of a face and implementation of a command based on the detected rotational movement, consistent with implementations described herein.

FIG. 7 is a diagram illustrating implementation of gaze tracking based commands for rotational movement based on a 3D model of a face 104 in gaze tracking mobile device 102.

The 3D model of the face 104 may be determined as described with respect to FIG. 6. In instances in which the user positions his/her head/face 104 in the line of sight of camera 214 of gaze tracking mobile device 102, gaze tracking mobile device 102 may determine rotational movement of head 104 in three axes of motion (pitch 122, yaw 132, and roll 142 of face 104). Gaze tracking mobile device 102 may also determine rotation along three axes based on gyroscope measurements (pitch 120, yaw 130, and roll 140 of gaze tracking mobile device 102). Gaze tracking mobile device 102 may implement the 3D modeling to detect rotational movements of head/face 104, including yaw 132 to stabilize gaze tracking and to provide enhanced capabilities for gaze tracking mobile device 102.

According to one embodiment, gaze tracking mobile device 102 may implement 3D tracking of face 104 within a range of motion in which a single eye (or no eyes) are visible to the camera of gaze tracking mobile device 102. In instances in which face 104/device 102 is rotated to a point (along a continuum of poses from frontal view, such as shown in video image 610-*a* of FIG. 6 to a side view) at which only one eye (or no eyes) is visible to the camera on gaze tracking mobile device 102. In these instances, gaze tracking mobile device 102 may continue to track the head 104 of the user.

According to another embodiment, gaze tracking mobile device 102 may filter out accidental or incidental/small movements to stabilize tracking per axis based on tracking of both gaze tracking mobile device 102 and face 104 for both lateral movement and rotational movement. For example, gaze tracking mobile device 102 may identify particular motions of gaze tracking mobile device 102 (or face 104) as accidental (or incidental) based on predetermined thresholds that define the accidental motion. Gaze tracking mobile device 102 may detect the difference between tilt of the device and movement of the eyes and determine based on that difference (and in some instances, a speed and direction) whether the motion is accidental.

According to another embodiment, gaze tracking mobile device 102 may determine a model that defines expected positions of the face 104 and defines expected positions of the face 104 based on gyroscope measurement of rotation (for angle), accelerometer measurement of motion (for planar movement) and 3D modeling based measurement of rotation of the face 104 (for angle of the face 104). In other words, gaze tracking mobile device 102 may keep a memory of where the face 104 is expected to be based on particular movement.

According to one embodiment, gaze tracking mobile device 102 may implement particular commands based on detected yaw 132 of the face/head 104 of the user. Gaze tracking mobile device 102 may use yaw detection for an additional input e.g. confirming or rejecting an action.

Figure 8:
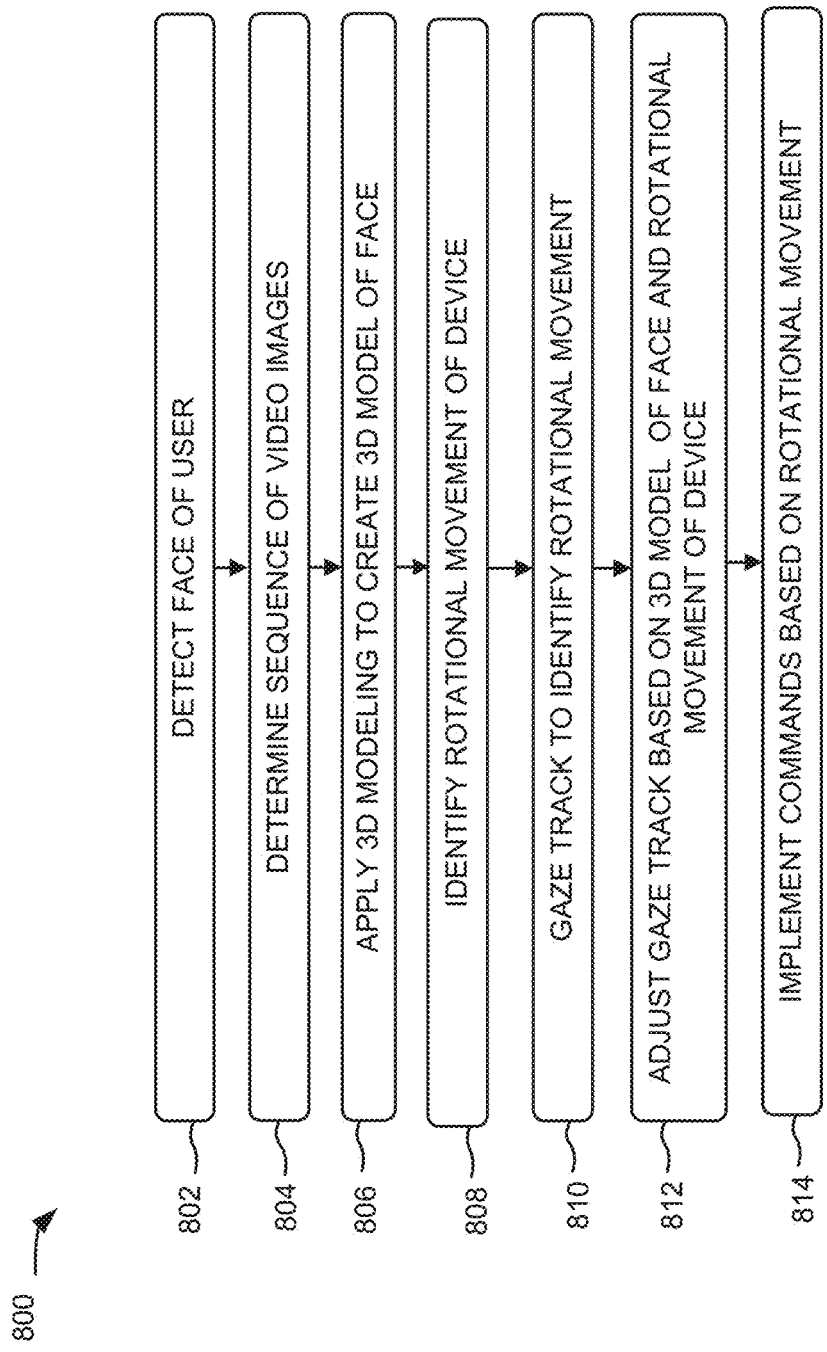
FIG. 8 is a flow diagram of an exemplary process for detecting rotational movement of a face based on a 3D model of the face, consistent with implementations described herein.

FIG. 8 is a flowchart of an exemplary process 800 for detecting rotational movement based on a 3D model of a face in a manner consistent with implementations described herein. Process 800 may execute in mobile device 102, such as by processor 302. It should be apparent that the process discussed below with respect to FIG. 8 represents a generalized illustration and that other elements may be added or existing elements may be removed, modified or rearranged without departing from the scope of process 800.

Gaze tracking mobile device 102 may detect a face of a user (block 802). For example, the user may place his/her face 104 in front of camera 214 of mobile device 102. Gaze tracking mobile device 102 may begin to gaze track the face 104 based on facial feature points, such as the eyes, eyebrows, nose mouth, etc. Gaze tracking mobile device 102 may track lateral movement of the face 104 (based on the video camera input of the face 104 of the user) and itself (based on accelerometer measurements of motion of the gaze tracking mobile device 102).

Gaze tracking mobile device 102 may determine a sequence of video images of the face 104 of the user (block 804). Gaze tracking mobile device 102 (or camera 214 of gaze tracking mobile device 102) may capture a sequence of video images of the face 104 that provide enough information to generate a 3D model of the face 104. Gaze tracking mobile device 102 may apply a generic sparsely populated 3D model of the face 104 to estimate each pose.

At block 806, gaze tracking mobile device 102 may apply 3D modeling to the sequence of video images to generate a 3D model of the face 104. For example, gaze tracking mobile device 102 may identify and isolate facial feature points in the video images, as described above with respect to images in row 620 of FIG. 6. In some instances, gaze tracking mobile device 102 may apply a priori information of the expected 3D face structure to improve modeling (and tracking) of the face 104. In some instances, the information may be dynamically replaced as additional information regarding the actual 3D face structure becomes available (e.g., the user turns his/her face 104 from side to side or from frontal face view to side profile). In some instances, gaze tracking mobile device 102 may perform dense disparity map computations based on the video images of the face 104. Gaze tracking mobile device 102 may create a 3D point cloud representation of the face 104.

Gaze tracking mobile device 102 may identify rotation around the axes of gaze tracking mobile device 102 (block 808). For example, gaze tracking mobile device 102 may receive gyroscope measurements of the motion of gaze tracking mobile device 102.

At block 810, gaze tracking mobile device 102 may gaze track the user to identify rotational movement based on the application of the 3D modeling to the 2D video camera input. For example, gaze tracking mobile device 102 may identify a yaw 132 of the face 104 of the user when the user turns his/her face 104 in a manner to generate yaw 132.

Gaze tracking mobile device 102 may adjust the gaze tracking of the face 104 of the user based on the 3D model of the face and rotational movement (e.g., yaw 130 or other types of movement, such as pitch 120 and roll 140) of gaze tracking mobile device 102 (block 812). For example, gaze tracking mobile device 102 may adjust the gaze tracking of the face 104 based on a combination of the determined rotational movement of the face 104 (e.g., yaw 132 of face 104) and gyroscope measurements of the motion of gaze tracking mobile device 102.

At block 814, gaze tracking mobile device 102 may implement commands based on detected rotational movement (and/or a current pose or position of the face/head 104). For example, gaze tracking mobile device 102 may implement a command to increase volume associated with output from speaker 102 based on the user turning his/her head to a particular position (or based on a particular motion). Gaze tracking mobile device 102 may implement commands adjusting text size in response to the user moving his/her head in a direction away from mobile device 102, switching to audio output as opposed to text output when the user moves his/her head such that his/her eyes no longer face mobile device 102, etc.

Systems and methods described herein may use multiple accelerometer measure points to detect a rotation speed associated with a device rotation. The systems may distinguish between intentional rotations and unintentional rotations using rotation speed and rotation angle.

The foregoing description of implementations provides illustration, but is not intended to be exhaustive or to limit the implementations to the precise form disclosed. Modifications and variations are possible in light of the above teachings or may be acquired from practice of the teachings.

In the above, while series of blocks have been described with regard to the exemplary processes, the order of the blocks may be modified in other implementations. In addition, non-dependent blocks may represent acts that can be performed in parallel to other blocks. Further, depending on the implementation of functional components, some of the blocks may be omitted from one or more processes.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code – it being understood that software and control hardware can be designed to implement the aspects based on the description herein.

It should be emphasized that the term "comprises/comprising" when used in this specification is taken to specify the presence of stated features, integers, steps or components but does not preclude the presence or addition of one or more other features, integers, steps, components, or groups thereof.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

The invention claimed is:

1. A computer-implemented method of gaze-tracking, the method comprising:
   detecting, by a camera of a mobile device, a face of a user of the mobile device;
   determining initial two dimensional (2D) video images for each of a sequence of poses of the face of the user as the face of the user moves through a range of rotational movement;
   generating a three dimensional (3D) model of a face of the user from the sequence of initial 2D video images of the face;
   identifying rotational movement of the mobile device;
   tracking the face of the user by capturing additional 2D images of the face of the user with the camera;
   identifying rotational movement of the face of the user based on an application of the 3D model of the face to the additional 2D images of the face of the user; and
   stabilizing gaze-tracking of the face by tracking an approximate position of the user's eyes based on identified positions of feature points of the face other than the eyes relative to the 3D model of the face and tracking and compensating for rotational movement of the mobile device.

2. The computer-implemented method of claim 1, further comprising:
   detecting a particular rotational movement of the face of the user; and
   generating and implementing a control command by the mobile device corresponding to the detected particular rotational movement.

3. The computer-implemented method of claim 2, wherein the detected particular rotational movement includes rotational movement around a yaw axis of the head.

4. The computer-implemented method of claim 2, wherein implementing the command comprises:
   activating an audio output of the mobile device.

5. The computer-implemented method of claim 4, further comprising:
   terminating the audio output based on an additional detected particular rotational movement.

6. The computer-implemented method of claim 1, further comprising:
   detecting at least one of a particular rotational speed and a particular rotational direction with respect to movement of the face; and
   generating commands by the mobile device based on the at least one of the detected particular rotational speed and the detected particular rotational direction.

7. The computer-implemented method of claim 1, wherein generating the 3D model comprises:
   generating a point cloud representation of the face from the sequence of initial 2D video images of the face of the user.

8. The computer-implemented method of claim 1, wherein tracking the face comprises:
   tracking the face to a position at which only one eye is visible.

9. The computer-implemented method of claim 1, wherein stabilizing the gaze-tracking of the face further comprises:
   detecting an accidental or incidental rotational movement of at least one of the mobile device or the face and filtering the accidental or incidental rotational movement from consideration as part of gaze-tracking of the mobile device.

10. The computer-implemented method of claim 1, wherein generating the 3D model includes:
    combining the sequence of initial 2D video images of the face of the user with a predetermined model of a representative head.

11. The computer-implemented method of claim 1, wherein the generating of the 3D model of the face of the user includes identifying and isolating a predetermined area of the face in each of the initial 2D video images of the face of the user, the predetermined area including feature points comprising the eyes and at least one of the eyebrows, the nose or the mouth of the user, and building the 3D model using each of the isolated areas from the sequence of initial 2D video images of the face of the user.

12. A mobile device, comprising:
    a video camera to receive video images of a user;
    a memory to store a plurality of instructions; and
    a processor configured to execute the instructions in the memory to:
        detect, by the video camera, a face of the user;
        determine initial two dimensional (2D) video images for each of a sequence of poses of the face of the user as the face of the user moves through a range of rotational movement;
        generate a three dimensional (3D) model of the face from the sequence of initial 2D video images of the face;
        identify rotational movement of the mobile device;
        track the face of the user by capturing additional 2D images of the face of the user with the camera;
        identify rotational movement of the face of the user based on an application of the 3D model of the face to the additional 2D images of the face of the user; and
        stabilize gaze-tracking of the face by tracking an approximate position of the user's eyes based on identified positions of feature points of the face other than the eyes relative to the 3D model of the face and tracking and compensating for rotational movement of the mobile device.

13. The mobile device of claim 12, wherein the processor is further configured to:
    detect a particular rotational movement of the face of the user; and generate and implement a control command by the mobile device corresponding to the detected particular rotational movement.

14. The mobile device of claim 13, wherein the detected particular rotational movement includes rotational movement around a yaw axis of the face.

15. The mobile device of claim 12, further comprising an infrared (IR) camera to receive IR images of the user.

16. The mobile device of claim 12, wherein the processor is further configured to:
   detect at least one of a particular rotational speed and a particular rotational direction with respect to movement of the face; and
   generate commands by the mobile device based on the at least one of the detected particular rotational speed and the detected particular rotational direction.

17. The mobile device of claim 12, wherein, when generating the 3D model, the processor is further configured to:
   generate a point cloud representation of the face from the sequence of initial 2D video images of the face of the user.

18. The mobile device of claim 12, wherein, when tracking the face, the processor is configured to:
   track the face to a position at which no eyes are visible.

19. The mobile device of claim 12, wherein the generation of the 3D model of the face of the user includes identifying and isolating a predetermined area of the face in each of the initial 2D video images of the face of the user, the predetermined area including feature points comprising the eyes and at least one of the eyebrows, the nose or the mouth of the user, and building the 3D model using each of the isolated areas from the sequence of initial 2D video images of the face of the user.

* * * * *